(12) United States Patent
Kwak et al.

(10) Patent No.: US 9,350,048 B2
(45) Date of Patent: May 24, 2016

(54) ELECTROLYTE FOR A LITHIUM RECHARGEABLE BATTERY, LITHIUM RECHARGEABLE BATTERY INCLUDING THE SAME, AND METHOD OF MANUFACTURING A LITHIUM RECHARGEABLE BATTERY

(75) Inventors: Gun-Ho Kwak, Yongin-si (KR); Sung-Hoon Kim, Yongin-si (KR); Tae-Ahn Kim, Yongin-si (KR); Bo-Ra Shin, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 1091 days.

(21) Appl. No.: 13/424,572

(22) Filed: Mar. 20, 2012

(65) Prior Publication Data

US 2012/0244419 A1    Sep. 27, 2012

Related U.S. Application Data

(60) Provisional application No. 61/466,761, filed on Mar. 23, 2011.

(51) Int. Cl.
| | | |
|---|---|---|
| *H01M 10/0567* | (2010.01) | |
| *H01M 10/0525* | (2010.01) | |
| *H01M 10/0568* | (2010.01) | |
| *H01M 10/0569* | (2010.01) | |

(52) U.S. Cl.
CPC ...... *H01M 10/0567* (2013.01); *H01M 10/0525* (2013.01); *H01M 10/0568* (2013.01); *H01M 10/0569* (2013.01); *Y02E 60/122* (2013.01); *Y10T 29/4911* (2015.01)

(58) Field of Classification Search
CPC ............... H01M 10/0567; H01M 10/0568; H01M 10/0569; H01M 10/0525; H01M 6/168; H01M 6/164; H01M 6/166; Y02E 60/122
See application file for complete search history.

(56) References Cited

U.S. PATENT DOCUMENTS

| | | | |
|---|---|---|---|
| 8,349,499 B2 * | 1/2013 | Oh et al. | 429/326 |
| 8,968,922 B2 * | 3/2015 | Lim et al. | 429/199 |
| 2008/0193852 A1 | 8/2008 | Murai | |
| 2009/0226808 A1 | 9/2009 | Hiwara et al. | |
| 2011/0027663 A1 | 2/2011 | Ohkubo et al. | |
| 2012/0231325 A1 | 9/2012 | Yoon et al. | |

FOREIGN PATENT DOCUMENTS

| | | |
|---|---|---|
| EP | 2262047 A1 | 12/2010 |
| EP | 2498329 A1 | 9/2012 |
| KR | 10-2010-0137415 | 12/2010 |

OTHER PUBLICATIONS

European Search Report in EP 12160660.2-1227/2503633, dated Oct. 23, 2012 (Kwak, et al.).
European Office Action in EP 12160660.2-1227, dated Jul. 5, 2012 (Kwak, et al.).
Korean Office Action dated Feb. 15, 2016.

* cited by examiner

*Primary Examiner* — Laura Weiner
(74) *Attorney, Agent, or Firm* — Lee & Morse, P.C.

(57) ABSTRACT

An electrolyte for a lithium rechargeable battery, a lithium rechargeable battery including the same, and a method of manufacturing lithium rechargeable battery, the electrolyte including a first additive, a second additive, a lithium salt; and a non-aqueous organic solvent.

13 Claims, 1 Drawing Sheet

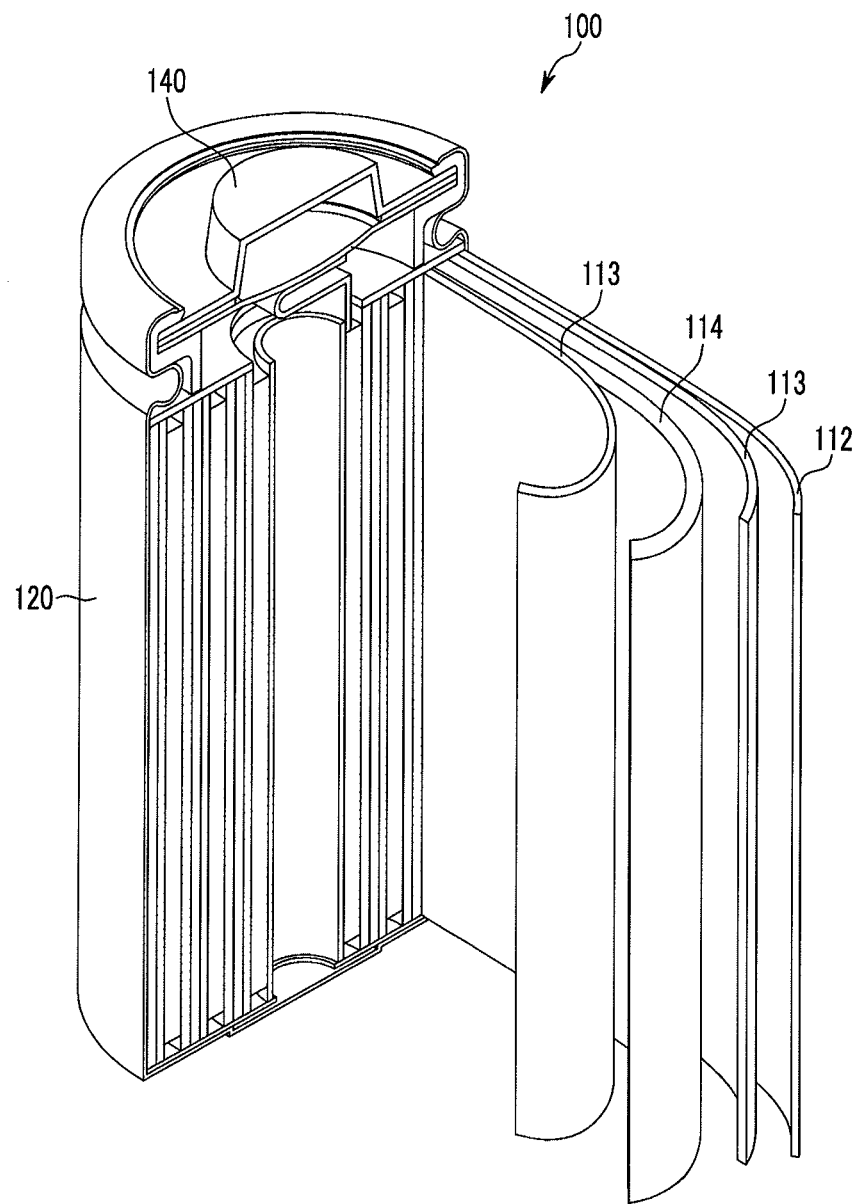

ELECTROLYTE FOR A LITHIUM RECHARGEABLE BATTERY, LITHIUM RECHARGEABLE BATTERY INCLUDING THE SAME, AND METHOD OF MANUFACTURING A LITHIUM RECHARGEABLE BATTERY

CROSS-REFERENCE TO RELATED APPLICATION

The present application claims priority under 35 U.S.C. §119(e) to U.S. Provisional Application No. 61/466,761, filed on Mar. 23, 2011, and entitled: "Electrode for Rechargeable Lithium Battery and Rechargeable Lithium Battery Including Same," which is incorporated herein by reference in its entirety.

BACKGROUND

1. Field

Embodiments relate to an electrolyte for a lithium rechargeable battery, a lithium rechargeable battery including the same, and a method of manufacturing a lithium rechargeable battery.

2. Description of the Related Art

Lithium rechargeable batteries have recently drawn attention as a power source for small portable electronic devices. Such batteries use an organic electrolyte and have twice as high discharge voltage as a battery using an alkaline aqueous solution and, accordingly, have high energy density.

SUMMARY

Embodiments are directed to an electrolyte for a lithium rechargeable battery, a lithium rechargeable battery including the same, and a method of manufacturing a lithium rechargeable battery.

The embodiments may be realized by providing a lithium rechargeable battery including an electrode assembly; a case accommodating the electrode assembly; and an electrolyte in the case, wherein the electrolyte includes a first additive, the first additive including a compound represented by at least one selected from the following Chemical Formulae 1 and 2:

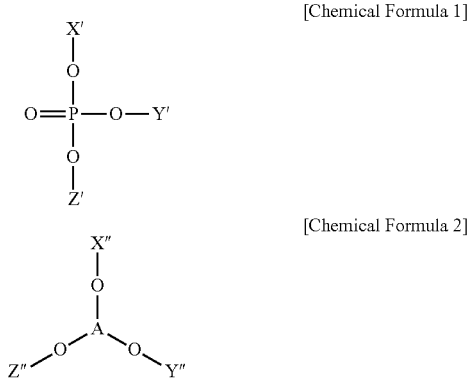

[Chemical Formula 1]

[Chemical Formula 2]

wherein, in Chemical Formulae 1 and 2 A is B or P, X', Y', and Z' are each independently hydrogen or $Si(R_a)_3$, $R_a$ being a C1 to C7 alkyl group, provided that X', Y', and Z' are not all hydrogen, and X", Y", and Z" are each independently hydrogen or $Si(R_b)_3$, $R_b$ being a C1 to C7 alkyl group, provided that X", Y", and Z" are not all hydrogen; a second additive, the second additive including a compound represented by at least one selected from the following Chemical Formulae 3 and 4:

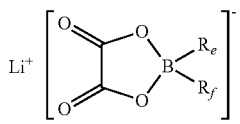

[Chemical Formula 3]

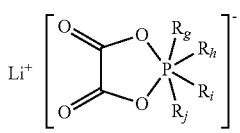

[Chemical Formula 4]

wherein, in Chemical Formulae 3 and 4 $R_e$ and $R_f$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, and $R_g$, $R_h$, $R_i$, and $R_j$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, or at least two of $R_g$, $R_h$, $R_i$, and $R_j$, are fused with each other to form an oxalate group; a lithium salt; and a non-aqueous organic solvent, wherein the first additive and the second additive are included in the electrolyte in a weight ratio of about 1:5 to about 3:1.

The first additive and the second additive may be included in the electrolyte in a weight ratio of about 1:4 to about 2:1.

The first additive and the second additive may be included in the electrolyte in a weight ratio of about 1:2 to about 2:1.

The compound represented by Chemical Formula 1 or 2 may include tris(trimethylsilyl)phosphite, tris(triethylsilyl)phosphite, tris(trimethylsilyl)phosphate, tris(triethylsilyl)phosphate, tris(trimethylsilyl)borate, tris(triethylsilyl)borate, trimethylsilylphosphite, trimethylsilylphosphate, trimethylsilylborate, triethylsilylborate, triethylsilylphosphite, triethylsilylphosphate, or a mixture thereof.

The compound represented by Chemical Formula 3 or 4 may include lithium oxalyldifluoroborate, lithium difluorobis(oxalato)phosphate, lithium tetrafluoro(oxalato)phosphate, lithium tris(oxalato)phosphate, or a mixture thereof.

The first additive may be included in the electrolyte in an amount of about 0.1 to about 10 parts by weight, based on 100 parts by weight of the non-aqueous organic solvent.

The compound represented by Chemical Formula 3 or 4 may include lithium oxalyldifluoroborate, lithium difluorobis(oxalato)phosphate, lithium tetrafluoro(oxalato)phosphate, lithium tris(oxalato)phosphate, or a mixture thereof.

The compound represented by Chemical Formula 3 or 4 may include lithium difluorobis(oxalato)phosphate, lithium tetrafluoro(oxalato)phosphate, lithium tris(oxalato)phosphate, or a mixture thereof.

The second additive may be included in the electrolyte in an amount of about 0.05 to about 10 parts by weight, based on 100 parts by weight of the non-aqueous organic solvent.

The second additive may be included in the electrolyte in an amount of about 0.05 to about 5 parts by weight, based on 100 parts by weight of the non-aqueous organic solvent.

The lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, LiN $(C_xF_{2x+1}SO_2)(C_yF_{2y+1}SO_2)$, x and y each independently being a natural number, LiCl, LiI, $LiB(C_2O_4)_2$ or a mixture thereof.

The electrolyte may have a lithium salt concentration of about 0.1 M to about 2 M.

The solvent may include a carbonate-based solvent, an ester-based solvent, an ether-based solvent, a ketone-based solvent, an alcohol-based solvent, an aprotic solvent, or a mixture thereof.

The solvent may include ethylene carbonate and a mixed solvent of ethylmethyl carbonate and dimethyl carbonate.

The solvent may include the ethylene carbonate and the mixed solvent of ethylmethyl carbonate and dimethyl carbonate in a weight ratio of about 10:90 to about 90:10.

The electrode assembly may include a positive electrode plate and a negative electrode plate, the positive electrode plate including a positive active material and the negative electrode plate including a negative active material, the positive active material may include a compound that reversibly intercalates and deintercalates lithium, and the negative active material may include a material that reversibly intercalates/deintercalates lithium ions, lithium metal, an alloy of lithium metal, a material that dopes and dedopes lithium, or a transition metal oxide.

The embodiments may also be realized by providing an electrolyte for a lithium rechargeable battery, the electrolyte including a first additive, the first additive including a compound represented by at least one selected from the following Chemical Formulae 1 and 2:

[Chemical Formula 1]

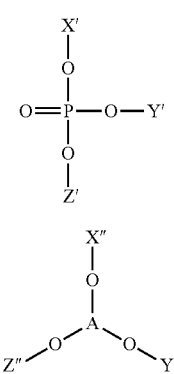

[Chemical Formula 2]

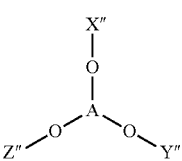

wherein, in Chemical Formulae 1 and 2 A is B or P, X', Y', and Z' are each independently hydrogen or $Si(R_a)_3$, $R_a$ being a C1 to C7 alkyl group, provided that X', Y', and Z' are not all hydrogen, and X", Y", and Z" are each independently hydrogen or $Si(R_b)_3$, $R_b$ being a C1 to C7 alkyl group, provided that X", Y", and Z" are not all hydrogen; a second additive, the second additive including a compound represented by at least one selected from the following Chemical Formulae 3 and 4:

[Chemical Formula 3]

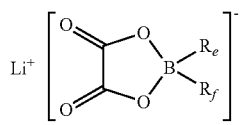

[Chemical Formula 4]

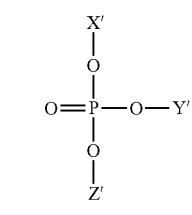

wherein, in Chemical Formulae 3 and 4 $R_e$ and $R_f$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, and $R_g$, $R_h$, $R_i$, and $R_j$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, or at least two of $R_g$, $R_h$, $R_i$, and $R_j$ are fused with each other to form an oxalate group; a lithium salt; and a non-aqueous organic solvent, wherein the first additive and the second additive are included in a weight ratio of about 1:5 to about 3:1.

The embodiments may also be realized by providing a method of manufacturing a lithium rechargeable battery, the method including preparing an electrode assembly; accommodating the electrode assembly in a case; adding an electrolyte to the case; and sealing the case, wherein the electrolyte includes a first additive, the first additive including a compound represented by at least one selected from the following Chemical Formulae 1 and 2:

[Chemical Formula 1]

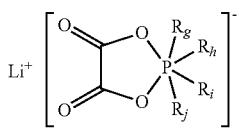

[Chemical Formula 2]

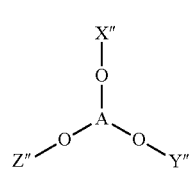

wherein, in Chemical Formulae 1 and 2 A is B or P, X', Y', and Z' are each independently hydrogen or $Si(R_a)_3$, $R_a$ being a C1 to C7 alkyl group, provided that X', Y', and Z' are not all hydrogen, and X", Y", and Z" are each independently hydrogen or $Si(R_b)_3$, $R_b$ being a C1 to C7 alkyl group, provided that X", Y", and Z" are not all hydrogen; a second additive, the second additive including a compound represented by at least one selected from the following Chemical Formulae 3 and 4:

[Chemical Formula 3]

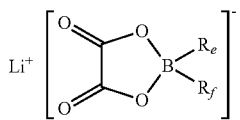

[Chemical Formula 4]

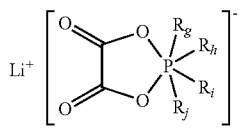

wherein, in Chemical Formulae 3 and 4 $R_e$ and $R_f$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, and $R_g$, $R_h$, $R_i$, and $R_j$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, or at least two of $R_g$, $R_h$, $R_i$, and $R_j$ are fused with each other to form an oxalate group; a lithium salt; and a non-aqueous organic solvent, wherein the first additive and the second additive are included in the electrolyte a weight ratio of about 1:5 to about 3:1.

BRIEF DESCRIPTION OF THE DRAWING

The embodiments will become more apparent to those of ordinary skill in the art by describing in detail exemplary embodiments with reference to the attached drawing, in which:

FIG. 1 illustrates a schematic view showing a rechargeable lithium battery according to one embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figure, the dimensions of layers and regions may be exaggerated for clarity of illustration. It will also be understood that when a layer or element is referred to as being "on" another element, it can be directly on the other element, or intervening elements may also be present. In addition, it will also be understood that when a layer is referred to as being "between" two elements, it can be the only element between the two elements, or one or more intervening elements may also be present. Like reference numerals refer to like elements throughout.

As a rechargeable lithium battery is charged and discharged, a substrate may be repetitively contracted and expanded and partially applied with over-voltage. As a result, a passivation layer, e.g., a solid electrolyte interface (SEI) layer, may slowly collapse or deteriorate, which may continuously cause a side reaction of an electrolyte with a surface of a negative electrode exposed thereto. Gases, such as CO, $CO_2$, $CH_4$, $C_2H_6$, and the like, may be generated, depending on kinds of carbonate used as a non-aqueous electrolyte solvent and a negative active material. Thus, internal pressure of a battery may be increased, thereby remarkably deteriorating its cycle characteristics. In addition, as the carbonate-based electrolyte is decomposed (depending on a graphite-based negative active material), and a carbon material is delaminated, a battery may have resultantly deteriorated electrical capacity or cycle characteristics, storage characteristics, low temperature characteristics, and the like.

The non-aqueous electrolyte according to an embodiment may include at least two, e.g., inorganic, additives in an optimal ratio. Thus, side reactions may be reduced and good film characteristics as well as excellent high temperature safety may be ensured. Thus, low temperature characteristics of a rechargeable lithium battery and its cycle-life when allowed to stand at a high temperature may be improved.

For example, a non-aqueous electrolyte for a rechargeable lithium battery according to an embodiment may include a first additive (for improving low temperature and power characteristics of a rechargeable lithium battery without deteriorating storage characteristics); a second additive (for improving power characteristics); a lithium salt; and a non-aqueous organic solvent. The first and second additives may be included at a weight ratio of about 1:4 to about 2:1.

If an excessive amount of the first additive were to be included, layer resistance of a negative electrode may be greatly increased. Thus, power characteristics of a cell may be deteriorated. If an excessive amount of the second additive were to be included, storage characteristics of a cell may be deteriorated. Accordingly, the first additive may be included in an amount of about 0.1 to about 10 parts by weight; and the second additive may be included in an amount of about 0.05 to about 10 parts by weight, all based on 100 parts per weight of the non-aqueous organic solvent. In an implementation, the second additive may be included in an amount of about 0.05 to about 5 parts by weight. The first and second additives may be included at a weight ratio of about 1:5 to about 3:1. In an implementation, the first and second additives may be included at a weight ratio of about 1:4 to about 3:1. In another implementation, the first and second additives may be included at a weight ratio of about 2:1 to about 1:2.

First Additive

The first additive may not be electrochemically reduced in all potential ranges. However, the first additive may remove radical negative ions, an intermediate for the solvent reduction, or may be combined with a final product (such as lithium alkyl dicarbonate, lithium alkoxide, and the like). Thus, the first additive may form a more stable SEI layer, thereby helping improve low temperature and power characteristics of a rechargeable lithium battery and its cycle-life when allowed to stand at a high temperature.

The first additive may be selected from compounds represented by the following Chemical Formulae 1 and 2, and a mixture thereof:

[Chemical Formula 1]

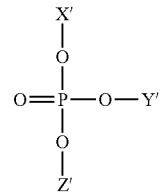

[Chemical Formula 2]

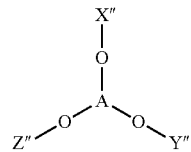

In Chemical Formulae 1 and 2,

A may be B or P. X', Y', and Z' may each independently be hydrogen or $Si(R_a)_3$ (wherein $R_a$ is a C1 to C7 alkyl group). In an implementation, X', Y', and Z' may not all simultaneously be hydrogen. X", Y", and Z" may each independently be hydrogen or $Si(R_b)_3$ (wherein $R_b$ is a C1 to C7 alkyl group). In an implementation, X", Y", and Z" may not all simultaneously be hydrogen.

In an implementation, the first additive may be selected from tris(trimethylsilyl)phosphite, tris(triethylsilyl)phosphite, tris(trimethylsilyl)phosphate, tris(triethylsilyl)phosphate, tris(trimethylsilyl)borate, tris(triethylsilyl)borate, trimethylsilylphosphite, trimethylsilylphosphate, trimethylsilylborate, triethylsilylborate, triethylsilylphosphite, triethylsilylphosphate, and a mixture thereof.

The first additive may be included in an amount of about 0.1 to about 10 parts per weight, based on 100 parts per weight of the non-aqueous organic solvent. When the first additive is included with the range, excellent ion conductivity may be realized.

Second Additive

An SEI layer formed of a $LiPF_6$-carbonate-based electrolyte may include $Li_2CO_3$, LiF, and the like. A LiF crystal may make the SEI layer unstable. Accordingly, the second additive may remove LiF from the SEI layer and may stabilize the SEI layer. Thus, power characteristics of a rechargeable lithium battery may be improved.

The second additive may be selected from compounds represented by the following Chemical Formulae 3 and 4, and a mixture thereof:

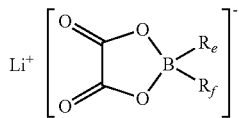

[Chemical Formula 3]

In Chemical Formula 3, $R_e$ and $R_f$ may each independently be a halogen, an unsubstituted or halogen-substituted C1 to C10 alkyl group, an unsubstituted or halogen-substituted C2 to C10 alkenyl group, or an unsubstituted or halogen-substituted C1 to C10 alkoxy group.

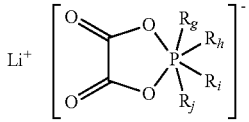

[Chemical Formula 4]

In Chemical Formula 4, $R_g$, $R_h$, $R_i$, and $R_j$ may each independently be a halogen, an unsubstituted or halogen-substituted C1 to C10 alkyl group, an unsubstituted or halogen-substituted C2 to C10 alkenyl group, or an unsubstituted or halogen-substituted C1 to C10 alkoxy group, or at least two of $R_g$, $R_h$, $R_i$, and $R_j$ may be fused with each other to form an oxalate group.

In an implementation, the second additive may be selected from lithium oxalyldifluoroborate (LiODFB), lithium difluorobis(oxalato)phosphate, lithium tetrafluoro(oxalato)phosphate, lithium tris(oxalato)phosphate (LiTOP), and a mixture thereof.

The second additive may be included in an amount of about 0.05 to about 10 parts by weight, based on 100 parts per weight of the non-aqueous organic solvent. In an implementation, the second additive may be included in an amount of about 0.05 to about 5 parts by weight, based on 100 parts per weight of the non-aqueous organic solvent. When the second additive is included within the range, good films having relatively low resistance on a negative electrode may be formed, thereby resulting in improved power and low temperature characteristics.

Lithium Salt

The lithium salt may be dissolved in the non-aqueous organic solvent and may be a lithium ion source inside the battery. For example, the lithium salt may basically operate a rechargeable lithium battery and may facilitate lithium ion transfer between positive and negative electrodes. Non-limiting examples of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (herein, x and y are a natural number), LiCl, LiI, $LiB(C_2O_4)_2$ (lithium bis(oxalato) borate; LiBOB), or a mixture thereof, and an electrolytic salt supporting them. The lithium salt may be included in a concentration of about 0.1 M to about 2 M. When the lithium salt is included within the concentration range, the electrolyte may have appropriate conductivity and viscosity and thus, excellent electrolyte performance may be achieved and lithium ion transfer may be effectively promoted.

Non-Aqueous Organic Solvent

The non-aqueous organic solvent may serve as a medium for transmitting ions taking part in the electrochemical reaction of the battery.

The non-aqueous organic solvent may include, e.g., a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like.

Examples of the ester-based solvent may include methyl acetate, ethyl acetate, n-propyl acetate, methylpropionate, ethylpropionate, γ-butyrolactone, decanolide, valerolactone, mevalonolactone, caprolactone, and the like.

Examples of the ether-based solvent may include dibutyl ether, tetraglyme, diglyme, dimethoxyethane, 2-methyltetrahydrofuran, tetrahydrofuran, and the like. Examples of the ketone-based solvent may include cyclohexanone and the like.

Examples of the alcohol-based solvent may include ethyl alcohol, isopropyl alcohol, and the like. Examples of the aprotic solvent may include nitriles such as R—CN (where R is a C2 to C20 linear, branched, or cyclic hydrocarbon group that optionally include a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, a mixture ratio can be controlled in accordance with a desirable battery performance.

The carbonate-based solvent may include a mixture of a cyclic carbonate and a linear carbonate. The cyclic carbonate and the linear carbonate may be mixed together in a volume ratio of about 1:1 to about 1:9. When the mixture is used as an electrolyte, electrolyte performance may be enhanced.

The non-aqueous organic electrolyte may further include mixtures of carbonate-based solvents and aromatic hydrocarbon-based solvents. The carbonate-based solvents and the aromatic hydrocarbon-based solvents may be mixed together in a volume ratio of about 1:1 to about 30:1.

The aromatic hydrocarbon-based organic solvent may be an aromatic hydrocarbon-based compound represented by the following Chemical Formula 5.

[Chemical Formula 5]

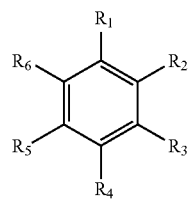

In Chemical Formula 5, $R_1$ to $R_6$ may each independently be hydrogen, a halogen, a C1 to C10 alkyl group, a $C_1$ to C10 haloalkyl group, or a combination thereof.

The aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further include an additive including, e.g., a vinylene carbonate or an ethylene carbonate-based compound represented by the following Chemical Formula 6 to improve cycle-life of a battery.

[Chemical Formula 6]

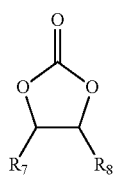

In the above Chemical Formula 6, $R_7$ and $R_8$ may each independently be selected from hydrogen, a halogen group, a cyano (CN) group, a nitro ($NO_2$) group, and a fluorinated C1 to C5 alkyl group. At least one selected from the $R_7$ and $R_8$ may be selected from a halogen group, a cyano (CN) group, a nitro ($NO_2$) group, and a fluorinated C1 to C5 alkyl group, and both of the $R_7$ and $R_8$ may not be hydrogen.

Examples of the ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. When the additive is added to improve cycle-life, it may be appropriately adjusted in its use amount.

In an implementation, the non-aqueous organic solvent (d) may include ethylene carbonate: a mixed solvent of ethylmethyl carbonate and dimethyl carbonate at a weight ratio ranging from about 10:90 to about 90:10, and specifically about 20:80 to about 80:20.

The non-aqueous electrolyte according to an embodiment may suppress a side reaction and may provide good film characteristics and excellent high temperature safety. Accordingly, low temperature characteristics of a rechargeable lithium battery and cycle-life (when allowed to stand or stored at a high temperature) may be improved.

Another embodiment provides a rechargeable lithium battery including the non-aqueous electrolyte.

A rechargeable lithium battery may be classified as, e.g., a lithium ion battery, a lithium ion polymer battery, and/or a lithium polymer battery (depending on kinds of a separator and an electrolyte); into a prismatic, cylindrical, coin-type, pouch, and the like (depending on a shape thereof); and into a bulk type, thin film type, and the like (depending on a size thereof). The structure of a battery and a method of manufacturing the battery are well-known in this field and will not be illustrated in detail.

FIG. 1 illustrates an exploded perspective view of a rechargeable lithium battery according to an embodiment. Referring to FIG. 1, the rechargeable lithium battery 100 may have a cylindrical shape and may include a negative electrode 112, a positive electrode 114, and a separator 113 (interposed between the negative electrode 112 and the negative electrode 114), an electrolyte (not shown) impregnating or surrounding the negative electrode 112, the positive electrode 114, and the separator 113, a battery container 120, and a sealing member 140 sealing the battery container 120. The rechargeable lithium battery 100 may be fabricated by sequentially laminating the negative electrode 112, the positive electrode 114, and the separator 113 therebetween, spirally winding the laminated product, and housing the wound product in a battery container 120.

The negative electrode 112 may include a current collector and a negative active material layer on the current collector. The negative active material layer may be formed of a negative active material.

The negative active material may include a material that can reversibly intercalate/deintercalate lithium ions, lithium metal, an alloy of the lithium metal, a material that can dope and dedope lithium, or a transition metal oxide.

The material that can reversibly intercalate/deintercalate lithium ions may be a carbon material and may include any suitable carbon-based negative active material used for a lithium ion secondary battery. For example, the carbon material may include crystalline carbon, amorphous carbon, or a combination thereof. Examples of the crystalline carbon may include amorphous, plate, flake, and spherical shapes or graphite such as fiber-type natural graphite or artificial graphite. The amorphous carbon may include soft carbon, hard carbon, a mesophase pitch carbonization product, fired coke, and the like.

The alloy of a lithium metal may include an alloy of lithium with a metal such as Na, K, Rb, Cs, Fr, Be, Mg, Ca, Sr, Si, Sb, Pb, In, Zn, Ba, Ra, Ge, Al, or Sn.

The material that can dope and dedope lithium may include Si, $SiO_x$ (0<x<2), a Si—X1 alloy (the X1 may be an alkali metal, an alkaline-earth metal, Group 13 to 16 elements, a transition element, a rare earth element, or a combination thereof but is not Si), Sn, $SnO_2$, a Sn—X2 alloy (the X2 may be an alkali metal, an alkaline-earth metal, Group 13 to 16 elements, a transition element, a rare earth element, or a combination thereof but is not Sn), and the like and also, a mixture of at least thereof with $SiO_2$. In an implementation, X1 and X2 may each independently include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include vanadium oxide, lithium vanadium oxide, and the like.

The negative active material layer may also include a binder and selectively, a conductive material.

The binder may play a role of adhering negative active material particles with one another and a negative active material to a current collector. Examples of the binder may include polyvinyl alcohol, carboxylmethylcellulose, hydroxypropylcellulose, polyvinylchloride, carboxylized polyvinylchloride, polyvinylfluoride, a polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material may supply conductivity to an electrode and may include any suitable electronic conductive material that does not cause any chemical change. For example, the conductive material may include a carbon-based material (such as natural graphite, artificial graphite, carbon black, acetylene black, ketjen black, a carbon fiber, and the like); a metal-based material (such as metal powder, metal fiber, or the like including a metal such as copper, nickel, aluminum, silver, and the like); a conductive polymer (such as a polyphenylene derivative and the like); or a mixture thereof.

The current collector may include a copper film, a nickel film, a stainless steel film, a titanium film, nickel foam, copper foam, a polymer substrate coated with a conductive metal, or a combination thereof.

The positive electrode 114 may include a current collector and a positive active material layer formed on the current collector.

The positive active material may include a compound that can reversibly intercalate and deintercalate lithium (e.g., a lithiated intercalation compound). For example, at least one composite oxide of a metal selected from cobalt, manganese, nickel, or a combination thereof with lithium may be used. For example, the composite oxide may include a compound represented by the following Chemical Formulae: $Li_aW_{1-b}R_bD_2$ (wherein, in the above Chemical Formula, $0.90 \leq a \leq 1.8$ and $0 \leq b \leq 0.5$); $Li_aE_{1-b}R_bO_{2-c}D_c$ (wherein, in the above Chemical Formula, $0.90 \leq a \leq 1.8$, $0 \leq b \leq 0.5$ and $0 \leq c \leq 0.05$); $LiE_{2-b}R_bO_{4-c}D_c$ (wherein, in the above Chemical Formula, $0 \leq b \leq 0.5$, $0 \leq c \leq 0.05$); $Li_aNi_{1-b-c}Co_bR_cD_\alpha$ (wherein, in the above Chemical Formula, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_\alpha$ (wherein, in the above Chemical Formula, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_\alpha$ (wherein, in the above Chemical Formula, $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cD_\alpha$ (wherein, in the above Chemical Formula, $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cO_{2-\alpha}Z_\alpha$ (wherein, in the above Chemical Formula, $0.90 \leq a \leq 1.8$, $0 \leq b \leq 0.5$, $0 \leq c \leq 0.05$ and $0 \leq a \leq 2$); $Li_aNi_{1-b-c}Mn_bR_cO_{2-\alpha}Z_2$ wherein, in the above Chemical Formula, $0.90 \leq a \leq 1.8$, $0 \leq b \leq 0.5$, $0 \leq c \leq 0.05$ and $0 \leq \alpha \leq 2$); $Li_aNi_bE_cG_dO_2$ (wherein, in the above Chemical Formula, $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, in the above Chemical Formula, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, in the above Chemical Formula, $0.90 \leq a \leq 1.8$ and $0.001 \leq b \leq 0.1$); $Li_aCoG_bO_2$ (wherein, in the above Chemical Formula, $0.90 \leq a \leq 1.8$ and $0.001 \leq b \leq 0.1$); $Li_aMnG_bO_2$ (wherein, in the above Chemical Formula, $0.90 \leq a \leq 1.8$ and $0.001 \leq b \leq 0.1$); $Li_aMn_2G_bO_4$ (wherein, in the above Chemical Formula, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3 (0 \leq f \leq 2)$; $Li_{(3-f)}Fe_2(PO_4)_3$ ($0 \leq f \leq 2$); and $LiFePO_4$.

In the above Chemical Formulae, W may be Ni, Co, Mn, or a combination thereof; R may be Al, Ni, Co, Mn, Cr, Fe, Mg, Sr, V, a rare earth element, or a combination thereof; D may be O, F, S, P, or a combination thereof; E is Co, Mn, or a combination thereof; Z may be F, S, P, or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; and J may be V, Cr, Mn, Co, Ni, Cu, or a combination thereof.

The compound may have a coating layer on a surface thereof or may be mixed with a compound with a coating layer. The coating layer may include an oxide of a coating element, a hydroxide of a coating element, an oxyhydroxide of a coating element, an oxycarbonate of a coating element, or a hydroxy carbonate of a coating element. The compound forming a coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by any suitable method that does not adversely influence properties of a positive active material by using these elements in the compound (e.g. spray coating and dip coating), which will be understood for those who work in a relate field and will be illustrated in more detail.

The positive active material layer may include a binder and a conductive material.

The binder may facilitate adhering of positive active material particles and a positive active material to a current collector. For example, the binder may include polyvinylalcohol, carboxylmethylcellulose, hydroxypropylcellulose, diacetylcellulose, a polymer including polyvinylchloride, carboxylized polyvinylchloride, polyvinylfluoride, polyvinylpyrrolidone including ethylene oxide, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material may supply conductivity to an electrode and may include any suitable electronic conductive material that doesn't cause a chemical change. For example, the conductive material may include natural graphite, artificial graphite, carbon black, acetylene black, ketjen black, carbon fiber; a metal powder or metal fiber including a metal such as copper, nickel, aluminum, silver, and the like; and the like and also, a polyphenylene derivative and the like in a singular or a mixture of more than two.

The current collector may include Al but is not limited thereto.

The negative and positive electrodes 112 and 114 may be fabricated by mixing an active material, a conductive material, and a binder in a solvent to prepare an active material composition and coating the composition on a current collector. The method of manufacturing an electrode is well-known and will not be illustrated in detail. The solvent may include N-methylpyrrolidone and the like, but is not limited thereto.

The electrolyte may be the electrolyte according to an embodiment.

A rechargeable lithium battery may include a separator 113 between a positive electrode 114 and a negative electrode 112. The separator 113 may include polyethylene, polypropylene, polyvinylidene fluoride, or a multilayer thereof and in addition, a mixed multilayer such as a double-layered polyethylene/polypropylene separator, a triple-layered polyethylene/polypropylene/polyethylene separator, a triple-layered polypropylene/polyethylene/polypropylene separator, and the like.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Examples 1-1 to 1-4 and Comparative Examples 1-1 and 1-2

Preparation of a Non-Aqueous Electrolyte

A non-aqueous electrolyte was prepared by mixing ethylene carbonate (EC), ethylmethyl carbonate (EMC), and dimethyl carbonate (DMC) according to the contents provided in the following Table 1, adding the first and second additives thereto, and then, dissolving a lithium salt therein. The second additive was lithium difluorobis(oxalato)phosphate.

TABLE 1

| | Solvent (parts by weight) | | | Lithium salt (M) | First additive (parts by weight) | | Second additive (parts by weight) |
|---|---|---|---|---|---|---|---|
| | EC | EMC | DMC | LiPF$_6$ | TMSPi | TMSB | |
| Comparative Example 1-1 | 20 | 40 | 40 | 1.15 | — | — | 1 |
| Comparative Example 1-2 | 20 | 40 | 40 | 1.15 | — | — | 2 |
| Example 1-1 | 20 | 40 | 40 | 1.15 | — | 0.5 | 1 |
| Example 1-2 | 20 | 40 | 40 | 1.15 | — | 0.5 | 2 |
| Example 1-3 | 20 | 40 | 40 | 1.15 | 2 | — | 1 |
| Example 1-4 | 20 | 40 | 40 | 1.15 | — | 1 | 1 |

In Table 1, EC denotes ethylene carbonate, EMC denotes ethylmethyl carbonate, DMC denotes dimethyl carbonate, TMSPi denotes tris(trimethylsilyl)phosphite, and TMSB denotes tris(trimethylsilyl)borate.

Examples 2-1 to 2-4 and Comparative Examples 2-1 and 2-2

Fabrication of Rechargeable Lithium Battery Cells

A positive slurry was prepared by mixing LiCoO$_2$ as a positive active material, polyvinylidene fluoride (PVDF) as a binder, and carbon as a conductive material at a weight ratio of 92:4:4 and adding N-methyl-2-pyrrolidone to the mixture. The positive slurry was coated on a 20 μm-thick aluminum foil as a current collector and then, dried and compressed in a 120° C. vacuum oven, fabricating a positive electrode.

A negative electrode slurry was prepared by mixing crystalline artificial graphite as a negative active material and PVDF as a binder at a weight ratio of 92:8 and dispersing N-methyl-2-pyrrolidinone into the mixture. The negative electrode slurry was coated on a 15 μm-thick copper as a current collector and then, dried and compressed in a 120° C. vacuum oven, fabricating a negative electrode.

Then, a 25 μm-thick polyethylene porous separator was interposed between the positive and negative electrodes, fabricating an electrode assembly. The electrode assembly was wound, compressed, and then housed in a prismatic can. The non-aqueous electrolytes according to Examples 1-1 to 1-4 and Comparative Examples 1-1 and 1-2 were respectively injected in the cans. The cans were sealed, fabricating rechargeable lithium battery cells according to Examples 2-1 to 2-4 and Comparative Examples 2-1 and 2-2.

Experimental Examples

The battery cells according to Examples 2-1 to 2-4 and Comparative Examples 2-1 and 2-2 were evaluated. The results are provided in the following Table 2.

Specifically, a power at a room temperature ($P_r$) power was measured as follows: the battery cells according to Examples 2-1 to 2-4 and Comparative Examples 2-1 and 2-2 were charged with various currents and a charge voltage ranging from 4.2V or 4.35V under CC-CV condition and discharged at IC up to 2.75V.

The following power at a room temperature ($P_r$) was represented as a percentage relative to the power at charge (587 W) and the power at discharge (875 W) of the battery cell according to Comparative Example 2-1.

The power at a low temperature ($P_l$) was measured in a −30° C. thermo-chamber according to the same method as at a room temperature. The following power at a room temperature ($P_l$) was represented as a percentage relative to the power at charge (38 W) and the power at discharge (96 W) of the battery cell according to Comparative Example 2-1.

A power retention rate after storing a battery cell at 85° C. for 6 days was obtained by measuring ratios of the powers at a room temperature again after storing the battery cells at 85° C. for 6 days relative to powers of battery cells at a room temperature.

TABLE 2

| | Power at a room temperature ($P_r$) | | Power at a low temperature ($P_l$) | | Power retention rate after being stored at 85° C. for 6 days | |
|---|---|---|---|---|---|---|
| | charge | discharge | charge | discharge | charge | discharge |
| Comparative Example 2-1 | 100% | 100% | 100% | 100% | 81.1% | 73.6% |
| Comparative Example 2-2 | 96% | 95% | 89% | 97% | 89.7% | 83.0% |
| Example 2-1 | 101% | 102% | 112% | 115% | 98.5% | 84.2% |
| Example 2-2 | 100% | 101% | 94% | 108% | 96% | 91% |
| Example 2-3 | 99% | 99% | 115% | 111% | 105.8% | 86.7% |
| Example 2-4 | 99% | 99% | 113% | 123% | 98.5% | 84.2% |

As may be seen in Table 2, the battery cells according to Examples 2-1 to 2-4 had excellent low temperature power characteristics and storage characteristics compared with the ones according to Comparative Examples 2-1 and 2-2.

By way of summation and review, the organic electrolyte for a rechargeable lithium battery may include a lithium salt (e.g., LiPF$_6$ and the like) and an organic solvent. The organic solvent may exhibit low reactivity with lithium, may have minimum internal resistance for smoothly transferring lithium ions, may exhibit thermal stability within a wide temperature range, may be highly compatible with a negative active material, and may have a high dielectric constant dissolving a large amount of a lithium salt. The organic solvent may include cyclic carbonate (such as propylene carbonate (PC), ethylene carbonate (EC), and the like); or linear carbonate (such as dimethyl carbonate (DMC), diethyl carbonate (DEC), and the like) and in addition, a hydrocarbon-based solvent (such as 1,2-dimethoxyethane, diethoxyethane, and the like).

Propylene carbonate has a low melting point of −49° C. and thus, may exhibit excellent low temperature characteristics, good compatibility with amorphous carbon, and a high dielectric constant and accordingly may dissolve a large amount of an inorganic lithium salt. However, propylene carbonate has a high viscosity. When used with a crystalline carbon-based negative active material (such as graphite), propylene carbonate may be inserted between carbon layers of a negative electrode during charging and may be decomposed, thereby producing propylene gas and lithium carbonate. As a result, battery capacity may be decreased and irreversible capacity may be increased. This irreversible capacity may be generated due to structural characteristics of carbon and may vary depending on reduction degree of an electrolyte on the interface of lithium with carbon and formation degree of an electrolyte protection layer on the surface of carbon.

Ethylene carbonate may not react with a graphite-based negative active material and may be easily applied to a battery including crystalline carbon as a negative electrode. In addition, ethylene carbonate has a high dielectric constant and may dissolve a large amount of lithium salt. However, ethylene carbonate may have high viscosity and a high melting point of about 36° C. and thus, may not be ideal with respect to low temperature performance.

In addition, linear carbonates such as DMC, DEC, and the like, may have a small viscosity and may be easily intercalated among negative active materials. Thus, irreversible capacity of a battery may be decreased. The linear carbonates may have low reactivity with lithium and a low dielectric constant and thus, may not dissolve a large amount of lithium salt. For example, DMC has high electric conductivity and may be used for a high current and high voltage battery. However, it has a high melting point (4.6° C.) and thus, poor low temperature characteristics. In addition, an organic solvent such as dimethyl formamide, acetonitrile, and the like may have a high dielectric constant but high reactivity with lithium, and thus may not be widely used.

Accordingly, in order to address the drawbacks of each electrolyte solvent, a method of mixing organic solvents has been recently suggested. For example, DEC (with good low temperature characteristics) may be added to EC/DEC. However, the mixtures alone may not sufficiently improve low temperature characteristics and may also have a low active material decomposition temperature and a high heating value. Thus, when it is applied to a battery, battery safety may not be secured.

The embodiments provide a non-aqueous electrolyte for a rechargeable lithium battery, the electrolyte undergoing fewer side reactions as well as exhibiting good film characteristics and excellent high temperature safety. Thus, low temperature characteristics and cycle-life (when allowed to stand at a high temperature) of a rechargeable lithium battery may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A lithium rechargeable battery, comprising:
an electrode assembly;
a case accommodating the electrode assembly; and
an electrolyte in the case, wherein the electrolyte includes:
a first additive, the first additive including a compound represented by at least one selected from the following Chemical Formulae 1 and 2:

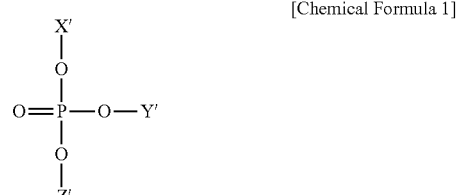

[Chemical Formula 1]

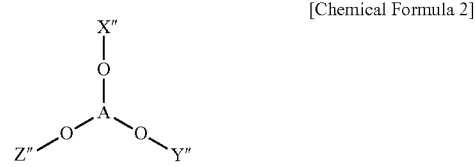

[Chemical Formula 2]

wherein, in Chemical Formulae 1 and 2:
A is B or P,
X', Y', and Z' are each independently hydrogen or $Si(R_a)_3$, $R_a$ being a C1 to C7 alkyl group, provided that X', Y', and Z' are not all hydrogen, and
X", Y", and Z" are each independently hydrogen or $Si(R_b)_3$, $R_b$ being a C1 to C7 alkyl group, provided that X", Y", and Z" are not all hydrogen;
a second additive, the second additive including a compound represented by at least one selected from the following Chemical Formulae 3 and 4:

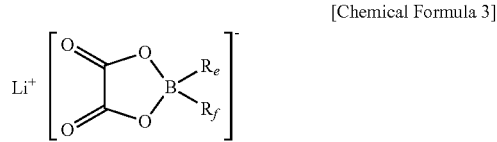

[Chemical Formula 3]

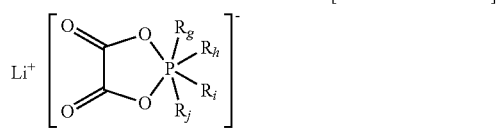

[Chemical Formula 4]

wherein, in Chemical Formulae 3 and 4:
$R_e$ and $R_f$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, and
$R_g$, $R_h$, $R_i$, and $R_j$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, or at least two of $R_g$, $R_h$, $R_i$, and $R_j$ are fused with each other to form an oxalate group;
a lithium salt; and
a non-aqueous organic solvent,
wherein:
the first additive is included in the electrolyte in an amount of about 0.1 to about 10 parts by weight, based on 100 parts by weight of the non-aqueous organic solvent, the second additive is included in the electrolyte in an amount of about 0.05 to about 10 parts by weight, based on 100 parts by weight of the non-aqueous organic solvent, and the first additive and the second additive are included in the electrolyte in a weight ratio of about 1:5 to about 3:1,
the compound represented by Chemical Formula 1 or 2 includes tris(trimethylsilyl)phosphite, tris(triethylsilyl)phosphite, tris(trimethylsilyl)phosphate, tris(triethylsilyl)phosphate, tris(trimethylsilyl)borate, tris(triethylsilyl)borate, or a mixture thereof, and
the compound represented by Chemical Formula 3 or 4 includes lithium oxalyldifluoroborate, lithium difluorobis(oxalato)phosphate, lithium tetrafluoro(oxalato)phosphate, lithium tris(oxalato)phosphate, or a mixture thereof.

2. The lithium rechargeable battery as claimed in claim 1, wherein the first additive and the second additive are included in the electrolyte in a weight ratio of about 1:4 to about 2:1.

3. The lithium rechargeable battery as claimed in claim 2, wherein the first additive and the second additive are included in the electrolyte in a weight ratio of about 1:2 to about 2:1.

4. The lithium rechargeable battery as claimed in claim 1, wherein the compound represented by Chemical Formula 3 or 4 includes lithium difluorobis(oxalato)phosphate, lithium tetrafluoro(oxalato)phosphate, lithium tris(oxalato)phosphate, or a mixture thereof.

5. The lithium rechargeable battery as claimed in claim 1, wherein the second additive is included in the electrolyte in an amount of about 0.05 to about 5 parts by weight, based on 100 parts by weight of the non-aqueous organic solvent.

6. The lithium rechargeable battery as claimed in claim 1, wherein the lithium salt includes $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, x and y each independently being a natural number, LiCl, LiI, $LiB(C_2O_4)_2$ or a mixture thereof.

7. The lithium rechargeable battery as claimed in claim 1, wherein the electrolyte has a lithium salt concentration of about 0.1 M to about 2 M.

8. The lithium rechargeable battery as claimed in claim 1, wherein the solvent includes a carbonate-based solvent, an ester-based solvent, an ether-based solvent, a ketone-based solvent, an alcohol-based solvent, an aprotic solvent, or a mixture thereof.

9. The lithium rechargeable battery as claimed in claim 1, wherein the solvent includes ethylene carbonate and a mixed solvent of ethylmethyl carbonate and dimethyl carbonate.

10. The lithium rechargeable battery as claimed in claim 9, wherein the solvent includes the ethylene carbonate and the mixed solvent of ethylmethyl carbonate and dimethyl carbonate in a weight ratio of about 10:90 to about 90:10.

11. The lithium rechargeable battery as claimed in claim 1, wherein:
the electrode assembly includes a positive electrode plate and a negative electrode plate, the positive electrode plate including a positive active material and the negative electrode plate including a negative active material, the positive active material includes a compound that reversibly intercalates/deintercalates lithium, and
the negative active material includes a material that reversibly intercalates/deintercalates lithium ions, lithium metal, an alloy of lithium metal, a material that dopes and dedopes lithium, or a transition metal oxide.

12. An electrolyte for a lithium rechargeable battery, the electrolyte comprising:
a first additive, the first additive including a compound represented by at least one selected from the following Chemical Formulae 1 and 2:

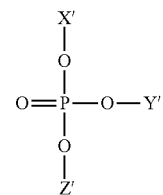

[Chemical Formula 1]

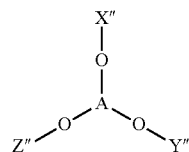

[Chemical Formula 2]

wherein, in Chemical Formulae 1 and 2:
A is B or P,
X', Y', and Z' are each independently hydrogen or $Si(R_a)_3$, $R_a$ being a C1 to C7 alkyl group, provided that X', Y', and Z' are not all hydrogen, and
X", Y", and Z" are each independently hydrogen or $Si(R_b)_3$, $R_b$ being a C1 to C7 alkyl group, provided that X", Y", and Z" are not all hydrogen;
a second additive, the second additive including a compound represented by at least one selected from the following Chemical Formulae 3 and 4:

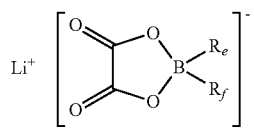

[Chemical Formula 3]

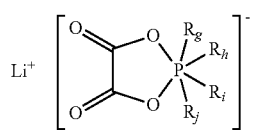

[Chemical Formula 4]

wherein, in Chemical Formulae 3 and 4:
$R_e$ and $R_f$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, and
$R_g$, $R_h$, $R_i$, and $R_j$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, or at least two of $R_g$, $R_h$, $R_i$, and $R_j$ are fused with each other to form an oxalate group;

a lithium salt; and a non-aqueous organic solvent, wherein:

the first additive is included in the electrolyte in an amount of about 0.1 to about 10 parts by weight, based on 100 parts by weight of the non-aqueous organic solvent, the second additive is included in the electrolyte in an amount of about 0.05 to about 10 parts by weight, based on 100 parts by weight the non-aqueous the first additive and the second additive are included in a weight ratio of about 1:5 to about 3:1, the compound represented by Chemical Formula 1 or 2 includes tris(trimethylsilyl)phosphite, tris(triethylsilyl)phosphite, tris(trimethylsilyl)phosphate, tris(triethylsilyl)phosphate, tris(trimethylsilyl)borate, tris(triethylsilyl)borate, or a mixture thereof, and the compound represented by Chemical Formula 3 or 4 includes lithium oxalyldifluoroborate, lithium difluorobis(oxalato)phosphate, lithium tetrafluoro(oxalato)phosphate, lithium tris(oxalato)phosphate, or a mixture thereof.

13. A method of manufacturing a lithium rechargeable battery, the method comprising:

preparing an electrode assembly;

accommodating the electrode assembly in a case;

adding an electrolyte to the case; and sealing the case, wherein the electrolyte includes:

a first additive, the first additive including a compound represented by at least one selected from the following Chemical Formulae 1 and 2:

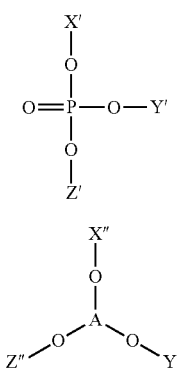

[Chemical Formula 1]

[Chemical Formula 2]

wherein, in Chemical Formulae 1 and 2:

A is B or P,

X', Y', and Z' are each independently hydrogen or $Si(R_a)_3$, $R_a$ being a C1 to C7 alkyl group, provided that X', Y', and Z' are not all hydrogen, and X", Y", and Z" are each independently hydrogen or $Si(R_b)_3$, $R_b$ being a C1 to C7 alkyl group, provided that X", Y", and Z" are not all hydrogen;

a second additive, the second additive including a compound represented by at least one selected from the following Chemical Formulae 3 and 4:

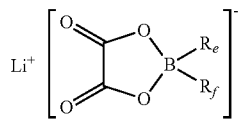

[Chemical Formula 3]

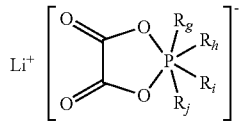

[Chemical Formula 4]

wherein, in Chemical Formulae 3 and 4:

$R_e$ and $R_f$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, and $R_g$, $R_h$, $R_i$, and $R_j$ are each independently a halogen, a halogen-substituted or unsubstituted C1 to C10 alkyl group, a halogen-substituted or unsubstituted C2 to C10 alkenyl group, or a halogen-substituted or unsubstituted C1 to C10 alkoxy group, or at least two of $R_g$, $R_h$, $R_i$, and $R_j$ are fused with each other to form an oxalate group;

a lithium salt, and a non-aqueous organic solvent, wherein:

the first additive is included in the electrolyte in an amount of about 0.1 to about 10 parts by weight, based on 100 parts by weight of the non-aqueous organic solvent, the second additive is included in the electrolyte in an amount of about 0.05 to about 10 parts by weight, based on 100 parts by weight of the non-aqueous organic solvent, and the first additive and the second additive are included in the electrolyte a weight ratio of about 1:5 to about 3:1, the compound represented by Chemical Formula 1 or 2 includes tris(trimethylsilyl)phosphite, tris(triethylsilyl)phosphite, tris(trimethylsilyl)phosphate, tris(triethylsilyl)phosphate, tris(trimethylsilyl)borate, tris(triethylsilyl)borate, or a mixture thereof, and the compound represented by Chemical Formula 3 or 4 includes lithium oxalyldifluoroborate, lithium difluorobis(oxalato)phosphate, lithium tetrafluoro(oxalato)phosphate, lithium tris(oxalato)phosphate, or a mixture thereof.

* * * * *